(12) United States Patent
Gemeniano

(10) Patent No.: US 10,277,631 B1
(45) Date of Patent: Apr. 30, 2019

(54) SELF-PRESERVING POLICY ENGINE AND POLICY-BASED CONTENT TRANSMISSION

(71) Applicant: Sprint Communications Company L.P., Overland Park, KS (US)

(72) Inventor: Glen S. Gemeniano, Walnut, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 256 days.

(21) Appl. No.: 15/206,053

(22) Filed: Jul. 8, 2016

(51) Int. Cl.
*H04L 29/06* (2006.01)
*H04L 29/08* (2006.01)

(52) U.S. Cl.
CPC ............ *H04L 63/20* (2013.01); *H04L 63/101* (2013.01); *H04L 67/02* (2013.01); *H04L 67/34* (2013.01)

(58) Field of Classification Search
CPC .............. G06N 99/005; H04L 63/1425; H04L 63/1416; H04L 41/16; H04L 43/16; H04L 63/14; H04L 63/20; H04L 43/04; H04L 63/101; H04L 67/02; H04L 67/34
See application file for complete search history.

(56) References Cited

U.S. PATENT DOCUMENTS

| 10,140,448 | B2* | 11/2018 | Lukacs | G06F 21/554 |
| 10,142,355 | B2* | 11/2018 | Thanos | H04L 63/1416 |
| 2010/0037321 | A1* | 2/2010 | Oz | G06F 21/57 726/24 |
| 2010/0071030 | A1* | 3/2010 | Rosenan | G06F 21/552 726/2 |
| 2010/0115621 | A1* | 5/2010 | Staniford | H04L 63/1416 726/25 |
| 2011/0145926 | A1* | 6/2011 | Dalcher | G06F 11/3466 726/26 |
| 2011/0167494 | A1* | 7/2011 | Bowen | G06F 21/566 726/24 |
| 2013/0054962 | A1* | 2/2013 | Chawla | H04L 9/321 713/156 |
| 2014/0108558 | A1* | 4/2014 | Borzycki | G06F 21/6218 709/205 |
| 2015/0201322 | A1* | 7/2015 | Kim | H04W 28/16 455/432.1 |
| 2015/0319182 | A1* | 11/2015 | Natarajan | G06F 21/53 726/24 |
| 2015/0347200 | A1* | 12/2015 | Fadel | G06F 21/53 719/319 |
| 2015/0350047 | A1* | 12/2015 | Bird | H04L 67/42 709/224 |
| 2015/0379284 | A1* | 12/2015 | Stuntebeck | G06F 21/62 726/30 |
| 2016/0026798 | A1* | 1/2016 | Martini | G06F 9/455 726/1 |
| 2017/0063968 | A1* | 3/2017 | Kitchen | H04L 67/10 |
| 2017/0346853 | A1* | 11/2017 | Wyatt | H04L 43/12 |

* cited by examiner

*Primary Examiner* — Chau Le

(57) ABSTRACT

Systems and methods herein discuss a policy engine stored on a mobile device that intercepts content requests to a content provider. The policy engine is self-preserving, and may, subsequent to intercepting the content requests and based upon a determination that the requesting entity is associated with a whitelist; blocking, by the policy engine. The policy engine may in some cases transmit at least some of the requested content in response to a determination that the requesting application is associated with a blacklist or may transmit an HTTP200 response to the requesting entity based on a determination that the requesting application anticipates a response.

19 Claims, 7 Drawing Sheets

SELF-PRESERVING POLICY ENGINE AND POLICY-BASED CONTENT TRANSMISSION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Applications stored on mobile devices may, when downloaded or after being downloaded, for example, during use or updates, display content to users. This content may be a game, an advertisement for a different application, items for purchase within or outside of the application, or other content. This content may be designed to enhance the user's experience, but some users may not want to download and/or view additional content.

SUMMARY

In an embodiment, a method of selectively transmitting content, comprising: intercepting, by a policy engine stored in a non-transitory memory of a user equipment (UE), a request for content from an application stored in the non-transitory memory of the UE; determining, by the policy engine, at least one policy of a plurality of policies stored in the policy engine and associated with at least one of the request, the application, and the UE; and based on the policy, at least one of: transmitting, by the policy engine, the request to a content provider based upon a determination that the requesting application is associated with a whitelist; blocking, by the policy engine, transmission of at least some of the requested content in response to a determination that the requesting application is associated with a blacklist; and transmitting, by the policy engine, a placebo message in response to the requesting application based on a determination that the requesting application anticipates a response.

In an embodiment, a system for selectively transmitting information comprising: a user equipment (UE) comprising a non-transitory memory, a plurality of applications, a policy engine, and a processor configured to execute the plurality of applications and the policy engine, wherein the UE is in communication with a policy server that stores a plurality of policies associated with selective content transmission are in communication via a network, wherein the policy engine, when executed by a processor, is configured to: receive a request from an application of the plurality of applications stored on the UE; determine, based on the requesting application, a response, wherein the response comprises at least one of: transmitting at least some of the requested content, blocking at least some of the requested content; sending a notification to the requesting application indicating that at least some of the requested content is blocked; transmitting an HTTP200 response to the requesting application; and transmitting a notification to the policy server.

In an alternate embodiment, a method of preserving policy engine integrity, comprising: receiving, by a server, a plurality of signals from a policy engine stored in a non-transitory memory of a user equipment (UE); comparing, by the server, the plurality of received signals to a plurality of expected signals; sending, by the server, a fraud alert in response to the comparison; transmitting, by the policy server, in response to the comparison, a file to the UE, wherein the file comprises an auto-installation routine and an executable associated with the policy engine, wherein the UE reinstalls the policy engine via the file; and receiving, by the server, from the updated and installed policy engine, a second plurality of signals subsequent to reinstallation of the policy engine.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
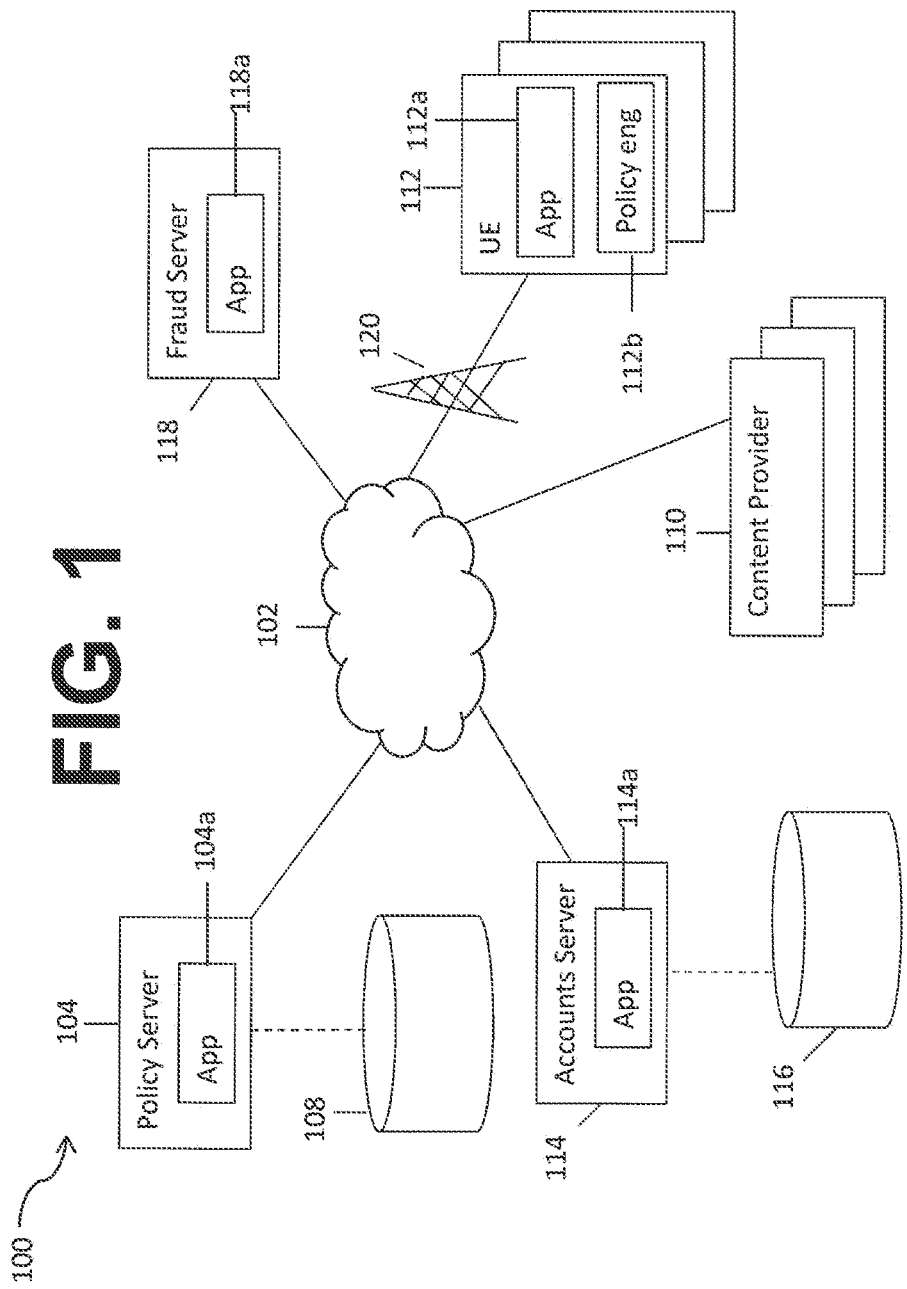
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

User equipment (UE) may come pre-loaded from a manufacturer and/or telecommunications services provider with a plurality of applications, an operating system, and other software and/or firmware components. Users may subsequently download additional applications from various sources such as applications stores from various telecommunications service providers. These downloaded applications may be malware, or may be otherwise configured to send content to a user subsequent to downloading that the user may not care to see, and that may interrupt the user's experience.

As such, using the systems and methods discussed herein, a policy engine stored on a UE may be employed to control and/or block requested content. In some embodiments, a content request may be redirected to additional/different content by the policy engine. The action taken when a content request is received may be based upon at least one policy of a plurality of policies stored in the policy engine. The policy engine may be employed as part of a paid subscription, promotional offer, or other option as offered by a telecommunications service provider. The policies stored in a policy engine may be dynamically updated and pushed to the policy engines stored on UEs by a policy server. The policy engine may be configured to be self-preserving and, alone or in combination with the policy server and/or a fraud server, detects and reports tampering and access attempts. Therefore, policy engine can be automatically reinstalled after tampering or deletion is detected without interruption of the user's service in the event that tampering, deactivation, or deletion of the policy engine is detected as discussed in detail below.

In an embodiment, the policy engine stores a plurality of policies based on individual applications, application type and history of content requests, UE network state, user accounts and service plans associated with UEs, as well as other factors. These policies may be established by the telecommunications service provider or by third parties, and may be installed at the time the policy engine is installed on the UE and subsequently, dynamically, updated. In one example, the third party content providers associated with fiscal applications may request the application of a policy or policies to requests for fiscal information or information stored in secure parts of the UE. Some policies may be associated with transmission of additional content, for example, if a policy stored in a policy engine in a UE intercepts a content request for X MB of data, and the policy engine determines that the UE is associated with a service plan that does not have "X MB" amount of data remaining, the policy engine may return a notification as such with a prompt that presents a link to the user via which the user can purchase additional data (or whatever additional services would be used to transmit the requested content if the content is otherwise permitted to be transmitted based on the policies in the policy engine). Thus, more than one policy may be applied to a request for content, and even if the requesting entity is determined to be on a whitelist, the content still may not be transmitted if another policy indicates as such.

In addition, the policy engine may be self-preserving, e.g., the policy engine may be able to detect problems with applications on the UE as well as detect attempts to tamper with the policy engine itself, send an alert, create a restore path if the policy engine is deleted/tampered with, and reinstall the policy engine without the user's experience being interrupted with frozen interfaces or forced restarting of the UE. Thus, the policy engine endeavors to assist in providing increased visibility and access to detecting and monitoring changes to the UE, including to the policy engine, and the framework integrates with the UE so that the policy engine restoration process and content delivery/blocking are less disruptive to service, in contrast to systems where the UE would freeze, reboot, or otherwise interrupt the user's experience.

In an embodiment, a UE undergoes a customization process at the OEM, at a user's/purchaser's home or work location, at a telecommunications service provider, or elsewhere, and a policy engine stored on the UE is enabled via a policy engine enablement code configuring on or downloading into the UE. The UE may then reboot/restart and register with a policy server associated with the telecommunications service provider. The policy engine may then determine if a policy is stored on the policy server for the UE, this policy may be based on, for example, what applications and services are accessible via the device. If a policy is determined to be available for the UE, the policy would be downloaded and installed on the UE. The policy engine may be associated with an opt-in service that can be associated with a user's account in order to further enhance the user's experience by intercepting requests including requests for content from third party applications. In some embodiments, for example if the policy server determines that a policy associated with a service plan may inhibit the transmission of requested content because there is not sufficient data remaining on the service plan, an offer to purchase a subscription or an enhanced service plan may be presented to the user on a graphical user interface (GUI) of the UE. If a user confirms the intent to purchase the subscription via a link in the notification offer, the policy server receives this confirmation and sends the associated policy to the UE for download and installation, as well as the requested content since the additional data (for example) is now available to use to transmit the requested content.

In an embodiment, the UE, for example, via the policy engine, may periodically and/or occasionally check with the policy server for updates based upon various factors including: (1) the UE being rebooted/restarted, (2) the downloading of new applications and services, and (3) the downloading of updates to previously downloaded applications and services. In an embodiment, a policy is downloaded from the policy server, installed on the UE via the policy engine, and enabled by the policy engine. When a request originates from an application on the UE, the policy engine compares the domain name and/or IP address associated with the request against a locally-stored blacklist of known delivery networks. The locally-stored blacklist, whitelist, and/or graylist (more details below) may be stored in a secure partition of the UE or may be stored in the policy engine, and may be configured to be dynamically updated by the policy server as new policies are added to the server and existing policies are updated and/or removed. A whitelist is the term that may be used to refer to a stored list or an indication associated with an IP address, domain name, application, content provider, etc., in order to indicate that the content from that entity is safe, e.g., that no additional verification or that only limited verification of requests is performed in order to grant requests from those entities. A blacklist is a term along the same, albeit reversed lines, where an entity is associated with the blacklist based on a history of fraudulent episodes and/or based on behavior similar to an entity or entities that are associated with the blacklist. Entities may be associated with the white or black lists for predetermined periods of time, and may be removed from either list and transferred to the other based upon recent patterns of behavior by the entity or by associated entities (e.g., if content provider X has 20 applications on a blacklist, new applications from content provider X may be automatically associated with a graylist, a "watch" list, or the blacklist).

In an embodiment, if the requesting domain name/IP address or the requested domain name/IP address is found on the blacklist, the policy engine enforces the policy by not delivering the data requested. As discussed in detail below, depending upon the embodiment, if the policy engine determines that the requested data is not to be delivered, placebo response such as an HTTP200 message may be returned to the requesting domain (app or service), or other actions may be taken by the policy engine. A placebo response may be sent if a response is indicated as expected by the requesting domain name/IP address. These alternate actions may include redirecting the request to a location that is not on the blacklist and that may instead be on a locally-stored whitelist. In some embodiments, the determination by the policy engine as to how to process the intercepted requests may be further based on a determination by the policy engine regarding a history of the requesting application's requests to access other applications (e.g., contacts, calendar, messaging services, web browsers, wallet services, etc.) on the subject UE or across a plurality of UEs. In addition, the size (amount) of content requested by and/or transmitted to applications on the UE may be tracked and used to establish policies for content delivery.

In an embodiment, the policy server may build instructions or rules to be sent out to the policy engine periodically or occasionally, this is a passive approach wherein, instead of blocking the advertisements, the clicks and views associated with a particular application or suite (package) of applications are tracked and a profile may be generated and stored on the policy server based on behaviors from the $3^{rd}$ party (requesting) applications. It is appreciated that the policy engine, including the policies, the blacklist, the whitelist, as well as grey or "watch" lists may be updated dynamically on a plurality of user equipments (UEs) by the policy server, which may push updates at predetermined intervals as well as responsive to determinations that a UE or UEs have downloaded or updated applications or services since a previous update. These updates to the policy engine, blacklists, whitelists, and gray lists may occur on a periodic or occasional basis, or responsive to the UE being rebooted/restarted, downloads of new applications and services, and downloads of updates to previously downloaded applications and services.

In an embodiment, there may be a learning algorithm employed where the third party applications available for installation and download on a plurality of UEs are monitored, and an application or application suite (package) may exhibit behavior similar to applications on a black or gray list. This learning algorithm may be employed by the policy engine to determine how to respond to a request for content even if the requesting application is not on a list, based on a history of behavior of other, similar applications that may have a common developer, type, or sensitivity level (e.g., fiscal/banking applications). This information may be stored on the policy server and pushed to the policy engine at predetermined intervals or in response to the download/installation of a new application or an update to an existing application.

In an embodiment, a user may install a plurality of applications on a UE, and some of these applications may contain malware or routines that request content that may be harmful to the UE. Some applications may attempt to uninstall or otherwise tamper with the policy engine in an effort to remove the policy engine from the content request and delivery process. Thus, the policy engine may be configured to be self-preserving, in that it sends signals along a predetermined schedule and/or in response to triggering events or requests from the policy or fraud servers. The policy engine may execute a hash function and send the resulting hashed value to the fraud engine. The receiving fraud engine or application may de-hash the received information to determine if a value of the signal corresponds to an expected value. If signals are expected along a predetermined schedule and/or in response to requests or triggering events, and are not received, the fraud server and/or policy server may be notified, and the policy server may push a message containing an executable file for the policy engine and an auto-installation routine to the UE that reinstalls the policy engine on the UE. Similarly, if signals are received by the policy server and/or fraud server and the hashed values are not the expected values (e.g., if a predetermined number or percentage of a total number signals received during a time period fail to produce the expected values), the other (policy/fraud) server may be notified and the message may be pushed to the UE to reinstall the policy engine. The fraud server may track these signals and store data associated with the requests made by applications stored on the UEs where reinstallations of the policy engine are performed, and may determine patterns of behavior for applications, suites (packages) of applications, and/or applications associated with certain content providers. These patterns of behavior may be used by the policy engine to determine how to process intercepted requests from applications that may not be associated with a black/white/gray list, and may be used to associate said applications with at least one list.

FIG. 1 illustrates a communication system 100 for selectively transmitting information, comprising a policy server 104 comprising a policy application 104a stored in a non-transitory memory (not shown) of the policy server 104 in communication with a data store 108 that comprises a plurality of policies associated with the operation of hardware, software, and firmware of a UE or a plurality of UEs 112. The plurality of policies may be associated with selective transmission of information by identifying what information is to be transmitted, what information is not to be transmitted, what requests are to be redirected, and if content other than the content requested is to be transmitted to a requesting application in response to a request, which may be referred to herein broadly as a request or a request for information. FIG. 1 illustrates a base transceiver station 120 in communication with the plurality of UEs 112 and the network 102. Various wireless protocols including CDMA, WiFi, and LTE may be used to support this connection.

In an embodiment, the user equipment (UE) 112 comprises a non-transitory memory (not shown), a plurality of applications 112a, a policy engine 112b, and a processor (not shown) configured to execute the plurality of applications 112a and the policy engine 112b. The UE 112 and the policy server 104 are in communication via a network 102, wherein the policy engine 112b, when executed by the processor, is configured to receive a request from the application 112a and intercept the request before sending it to the network 102 and to one of the content providers 110. The request may be a request for content directed towards a URL, domain name, or IP address, or another reference to the Internet.

The policy engine 112b may determine, based on a domain name, IP address, developer, program suite, or other aspect of the requesting application 112a, a response to the request, wherein the response comprises at least one of: (1) transmitting at least some of the requested content, blocking at least some of the requested content; (2) sending a notification to the requesting application 112a indicating that at least some of the requested content is blocked; (3) transmitting an HTTP200 response to the requesting application; (4) transmitting a notification to the policy server; and (5) transmitting the request to a content provider of the plurality of content providers 110 selected based upon a determination as to which provider is associated with the request and a determination that the requesting application 112a is associated with a whitelist. The requested information may be transmitted by the selected content provider to the policy engine 112b for transmission to the requesting application 112a, or may be transmitted directly to the requesting application 112a.

In another embodiment, an accounts server 114 may comprise a non-transitory memory (not shown) storing an application 114a, and may be in communication with an accounts data store 116. The accounts data store 116 may comprise information for a plurality of accounts associated with individual, family, and corporate users and their devices, including an account associated with the UE 112. The policy engine 112b may request information from the accounts data store 116 to determine if the UE 112 is associated with a subscription plan that allows for the transmission of the requested information, for example, whether there is sufficient data allotted for a billing time period that will allow the requested content to be transmitted. If the policy engine 112b determines that the subscription plan does not allow for the transmission of the requested information, the policy engine 112b may return a message to the UE 112 including an offer and/or a link to an avenue via which the user may purchase additional data or other aspects of a subscription plan (e.g., add-ons or an entirely new plan).

In an embodiment, the policy engine 112b may be configured, once installed, to be self-preserving in order to guard against tampering and removal. That is, the policy engine 112b may be configured to send periodic signals that may be referred to as "heartbeats" or "pulses," along a predetermined schedule, occasionally and/or in response to a change on the UE 112 such as the download or installation of an application or service or an update to previously downloaded applications and services. In some embodiments, the policy engine 112b may send signals in response to inquiries from the fraud server 118 and/or the policy server 104.

In an embodiment where the signals from the policy engine 112b are to be sent to the policy server 104 (e.g., via the app 104a), a hash function may be employed to send and receive the heartbeats to determine whether the policy engine is intact. That is, the policy engine 112b executes a hash function and sends the resultant value to the policy server 104 and/or a fraud server 118. The server receiving the hashed value executes a function to de-hash the received value. If a signal or a predetermined number or pattern of signals is not received or if a hash on the received signal fails during a predetermined period of time, a fraud server 118 may be notified if it did not receive the information initially (e.g., in an example where the fraud server 118 is not the entity that receives the signals). The fraud server 118 may comprise a fraud application 118a configured to receive fraud alerts, the fraud server 118 is in communication with the policy server 104, the accounts server 114, a plurality of content providers 110, and a plurality of UEs 112 via the network 102. In some embodiments, if an account for the UE 112 stored on the accounts server 114 is associated with a fiscal service or multiple fiscal services, the signals may be sent on a more frequent basis than, for example, a UE 112 account that is not tied to such activities.

In an embodiment, if the fraud server 118 received an indication that one or more heartbeats have been missed, e.g., that a maximum number or frequency of signals over a predetermined time interval have been missed, a fraud alert may be sent to the telecommunications provider via the policy server 104 and/or the accounts server 114 by the fraud server 118, and a flag may be set in an account (stored on the accounts server 114) for the UE 112. In one example, setting this flag may limit the types of requests from the UE 112 processed, or may limit the types and functions of services and applications that can be downloaded/executed/accessed from the UE 112.

In an embodiment, the fraud server 118 in conjunction with the policy server 104 may track access attempts by various applications on a UE to the contacts (address book), e-wallet, and other applications from third parties or as installed by the telecommunications service provider or UE manufacturer. In an embodiment, the fraud server 118 and/or the policy server 104 may send a notification to a content provider 110 if it is determined that a particular application 112a or suite of applications from the content provider 110 is responsible for a plurality of attacks on the policy engine 112b. In various embodiments, the content provider 110 may be send a request or demand for payment of damages, may be banned from the network 102, or may be added to the blacklist. In addition, the content provider's 110 information may be shared with other telecommunications service provider, which may incentivize a content provider with the goodwill to self-police and promptly address problems.

In an embodiment, a control action may be taken by the telecommunications service provider including taking temporary control of the UE 112 and automatically reinstalling the policy engine 112b to ensure the integrity of the policy engine 112b. In some embodiments, the signal sent from the policy engine 112b to the policy server 104 and/or to the fraud server may indicate the health of the policy engine 112b. In alternate embodiments, the signal sent may indicate that the policy engine 112b has been tampered with or that an attempt to tamper with (or uninstall in whole or in part) the policy engine 112b has been made. That is, the signals sent from the policy engine 112b to the policy server 104 (or another server configured to receive such signals) may indicate health or a potential integrity concern if a received hash value is de-hashed and an expected value is not received, and a missed signal or pattern/duration of signals may also indicate a potential integrity concern with the policy engine 112b. In an embodiment where the policy engine 112b is reinstalled based upon received (or missed) signals, the reinstall is performed without user intervention or awareness.

Figure 2:
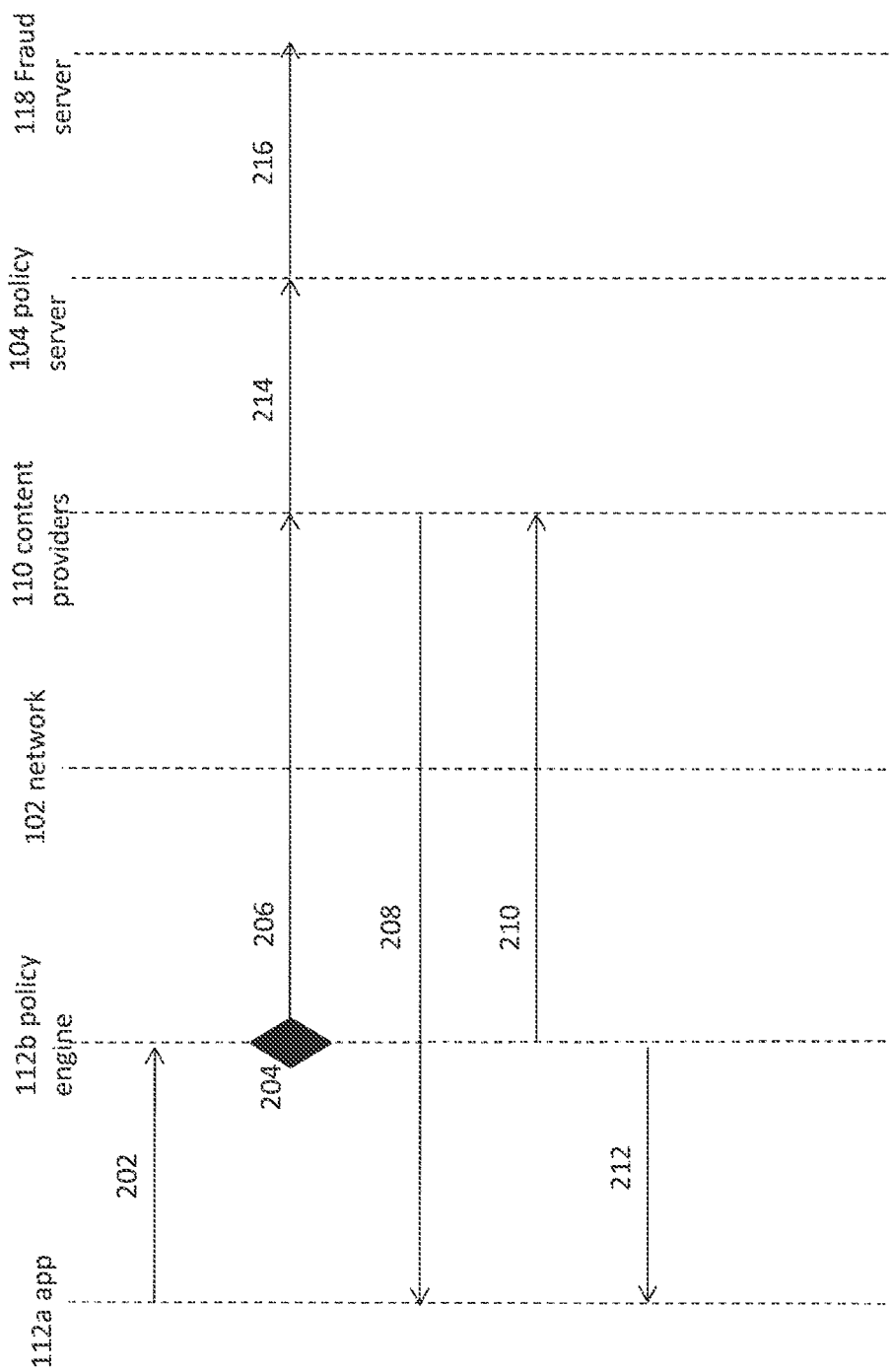
FIG. 2 is a message sequence diagram according to an embodiment of the disclosure.

FIG. 2 illustrates message sequence diagram 200 of selectively transmitting content. At block 202, an application such as application 112a in FIG. 1 sends a request to the network 102 for content. In an embodiment, the request sent at block 202 may be a single request, and in some embodiments, a plurality of requests may be sent at block 202 at periodic intervals that may be linked to usage of the application 112a. At block 204, the policy engine 112b stored on the same device as the application 112a determines if the requested content may be sent. This determination may be based on a plurality of policies stored in the policy engine 112b, these policies may be associated with individual applications, application classes, application developers/owners, roaming/in-network status ("network state"), credit/service plan remaining (e.g., a policy may be used to determine whether enough data is available to transmit the requested content). In some embodiments, when a UE 112 is determined to be roaming, this may impact whether the requested content is returned to the UE, and/or what other actions may be taken. In some embodiments, the policy engine 112b is dynamically updated by a remote server, for example, the policy server 104 in FIG. 1, when additional applications are downloaded to the UE 112 or existing applications are removed. In an embodiment, the network state, e.g., is the UE associated with the application 112a a mobile device associated with a CDMA, WiFi, LTE, or other type of network, and this network state may be stored in and/or accessible by the policy server 104. The determination at block 204 may be further based on a determination by the policy server 104 as to whether the requesting application 112a has requested access to other applications (e.g., contacts, calendar, messaging services, web browsers, wallet services, etc.) on the UE 112, the frequency with which these requests from applications and from the network 102 were made, the frequency with which the requests were granted, and combinations of those factors. In some embodiments, applications such as 112*a* may try to uninstall the policy engine 112*b*, or try to otherwise tamper with it so that content requested may be transmitted without interference by the policy engine 112*b*. This is discussed in further detail in FIG. 3 below.

The policy engine 112*b* may comprise a blacklist, that is, a list of entities where requests for content are blocked and/or redirected, as well as a whitelist of entities for which content requests are to be granted. A whitelist is the term that may be used to refer to a stored list or an indication associated with an IP address, domain name, application, content provider, etc., in order to indicate that the content from that entity is safe, e.g., that no additional verification or that only limited verification of requests is performed in order to grant requests from those entities. A blacklist is a term along the same, albeit reversed lines, where an entity is associated with the blacklist based on a history of fraudulent episodes and/or based on behavior similar to an entity or entities that are associated with the blacklist. In some embodiments, there may be a third list stored in the policy engine 112*b*. The third list, a "gray" list, may comprise a plurality of applications or applications suites (packages) that are being monitored to determine if the request pattern from these applications is similar to applications on the whitelist or the blacklist. The decision at block 204 may be based on any or all of the factors above, and an application may end up on the blacklist, whitelist, or graylist, based upon factors such as the number, frequency, and type, of applications it requested and/or was denied/granted access to. Thus, at block 204, a determination is made as to whether to transmit the requested content, and that determination may include whether the requesting UE 112 is roaming, what list the requesting application 112*a* is associated with, the past history of requests from the application 112*a* (type, frequency, granted/denied), as well as other factors.

At block 206, in response to a determination at block 204 that some or all of the requested content can be transmitted to the device where the application 112*a* is stored, the request may be sent to the content provider 110 via the network 102, and the content is returned to the application 112*a* for display at block 208. In some embodiments, at block 208, only a portion of the content requested at block 202 is returned, and in alternate embodiments, for example, if the policy engine 112*b* determines that the application 112*a* is on a white list, all of the requested content may be returned to the application at block 208. The requested content may comprise advertisements, offers for redemption of existing credits within the application 112*a*, information associated with app updates or related apps, or other content, some or all of which may be intended for display to the user of the UE 112. In an embodiment, at block 210, based on the determination at block 204, the policy engine 112*b* may transmit the request to the content provider 110 to retrieve content different than the content requested at block 202 based on a policy stored in the policy engine 112*b* and evaluated at block 204.

In an embodiment, if it is determined at block 204 that the application 112*a* is on a blacklist, the policy engine 112*b* may not take any further action. In other embodiments, at block 212, in response to a determination that the application 112*a* is on a blacklist, the policy engine 112*b* may return an HTTP200 response to the application 112*a*, for example, if the policy engine determines that the execution of the application 112*a* and/or the operation of the UE on which it is executing will be compromised. It is appreciated that an "HTTP200 response" refers to the hypertext transfer protocol (HTTP) response status code that may be sent to indicate to the requesting application 112*a* that the request sent at block 202 was successfully transmitted. The HTP200 request may be referred to as an "OK response." This HTTP200 response may be transmitted at block 212 so that the requesting application 112*a* does not continue to send requests until a response is received.

In some embodiments, at block 214, the policy engine 112*b* may transmit the intercepted request to the policy server 104, and at block 216 the policy engine 112*b* or policy server 104 may transmit the intercepted request to the fraud server 118. The fraud server 118 and/or the policy server 104 may track the intercepted requests as well as whether the requests were granted and/or how the requests were handled. Policies stored in the policy server 104 may be updated based on this information, and additional policies may be generated based upon the collected and stored request information.

The policy engine 112*b* is installed by the UE manufacturers or telecommunications service providers and may be updated by the policy server 104 on a periodic basis or due to triggering events. The policy engine 112*b* may be associated with a service that provides UE users (telecommunications service providers) with the option to opt out of content from third party content providers. Thus, some applications downloaded to the UE, for example, from app stores or from an internet portal, may endeavor to tamper with or delete the policy engine 112*b* in order to download more content to the UE. As such, the policy engine 112*b* may be configured to be self-preserving as discussed below in FIG. 3. Policies stored in the policy server 104 may be further updated based on information sent to the policy server 104 and/or fraud server 118, and additional policies may be generated based upon the collected and stored request information.

Figure 3:
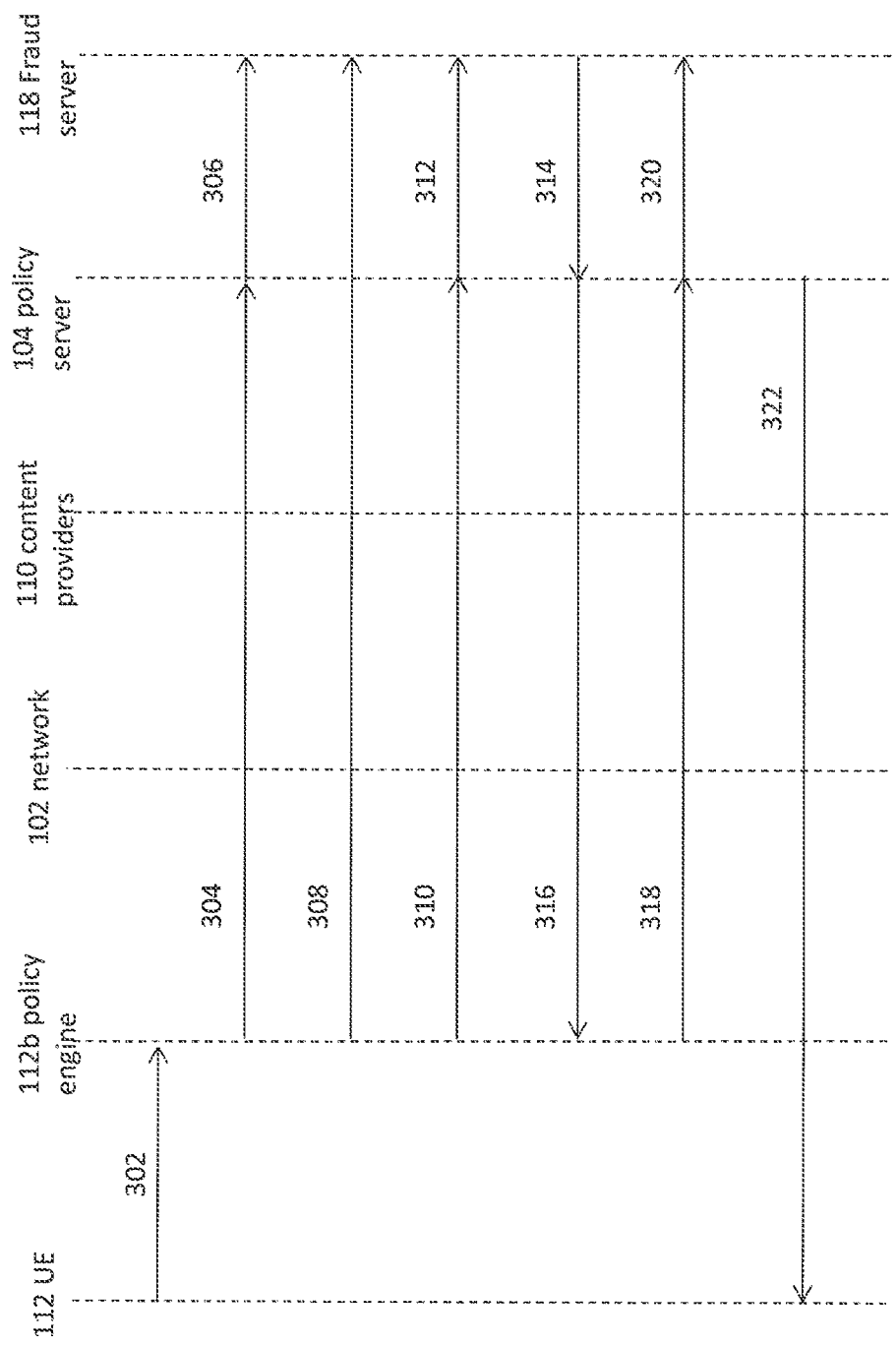
FIG. 3 is another message sequence diagram according to an embodiment of the disclosure

In the method 300 in FIG. 3, at block 302, the policy engine 112*b* receives a plurality of requests for content and access (to other applications on the UE) from a plurality of applications on the UE. At block 304, the policy engine 112*b* sends at least some of the requests for content and access to the policy server 104, and to the fraud server 118 at block 306. These received requests may be tracked and stored by the policy server 104 and the fraud server 118 at least for the purpose of generating new policies, notifying content providers of malware applications/that the provider may be blocked or restricted from offering applications based upon previous applications' performance, and may be used additionally to predict the behavior of requesting applications that may not be associated with a black/white/gray list in the policy engine 112*b* or on the policy server 104.

In an embodiment, at block 308, the policy engine 112*b* sends a plurality of signals to the fraud server 118 on a predetermined schedule or in response to a trigger such as a new application being installed on the UE 112 or an application already installed on the UE 112 being updated, including via an attempted push from a remote content server or via an opt-in purchase. In some embodiments, at block 308, the policy engine 112*b* may send the signals to the fraud server 118 in response to one or more attempts by an application on the UE to alter/tamper with/delete the policy engine 112*b*. In an embodiment, the frequency of heartbeats associated with this predetermined schedule may increase if the policy engine 112*b* determines that fiscal applications or other applications that access secure information and/or secure partitions of the UE are present on the UE.

In an alternate embodiment, at block 310, the policy engine 112b sends a plurality of signals to the policy server 104 along a predetermined schedule or in response to a trigger such as a new application being installed on the UE 112 or an application already installed on the UE 112 being updated. In some embodiments, signals sent to the policy server 104 at block 310 may cause the policy server to transmit a policy engine update to the UE at block 322. In an embodiment, at block 312, at least some of the signals sent to the policy server 104 are also sent to the fraud server 118, and may be tracked to determine if there are any anomalies or patterns in signal receipt over a period of time that may indicate that the policy engine 112b has been tampered with. These anomalies or patterns may comprise de-hashed values that are not the expected values, or un-hashed signals received that are not received along an expected schedule.

In some embodiments, the policy engine 112b may send signals in response to signals sent from the fraud server 118 at block 314 and/or from the policy server 104 at block 316, and the responses that may be sent back to the policy server 104 at block 318 and/or to the fraud server 118 at block 320 may be hashed at the point of receipt by the policy server 104 or fraud server 118 to determine if an expected value is received. In addition to updates from the policy server 104 at block 322, if a plurality of signals are not received by the policy server 104 and/or the fraud server 118 along a predetermined schedule or in response to triggering events, a file may be sent to the UE 112. The file sent at block 322 may comprise an auto-installation routine and an executable file, the auto-installation routine executes the file on the UE 112 and re-installs and/or repairs the policy engine 112b. This process in method 300 may occur in the background, that is, the heartbeats sent from the policy engine 112b as well as any patching or reinstalling may be accomplished without interrupting device functionality unassociated with sending requests for content, e.g., voice services or data services that are not making requests for content that would run through the policy engine 112b.

In an embodiment, the policy engine 112b sends a hashed signal to the policy server 104, and the policy server 104 executes a hash (de-hash) function on the signal. If an expected value is obtained based on the hash function, and/or if a predetermined number of signals have hash functions applied and expected value obtained, the policy server 104 may determine that the policy engine 112b is intact. In an embodiment, the heartbeats may be sent based on a triggering event such as a new application being installed or an existing application being updated.

Figure 4:
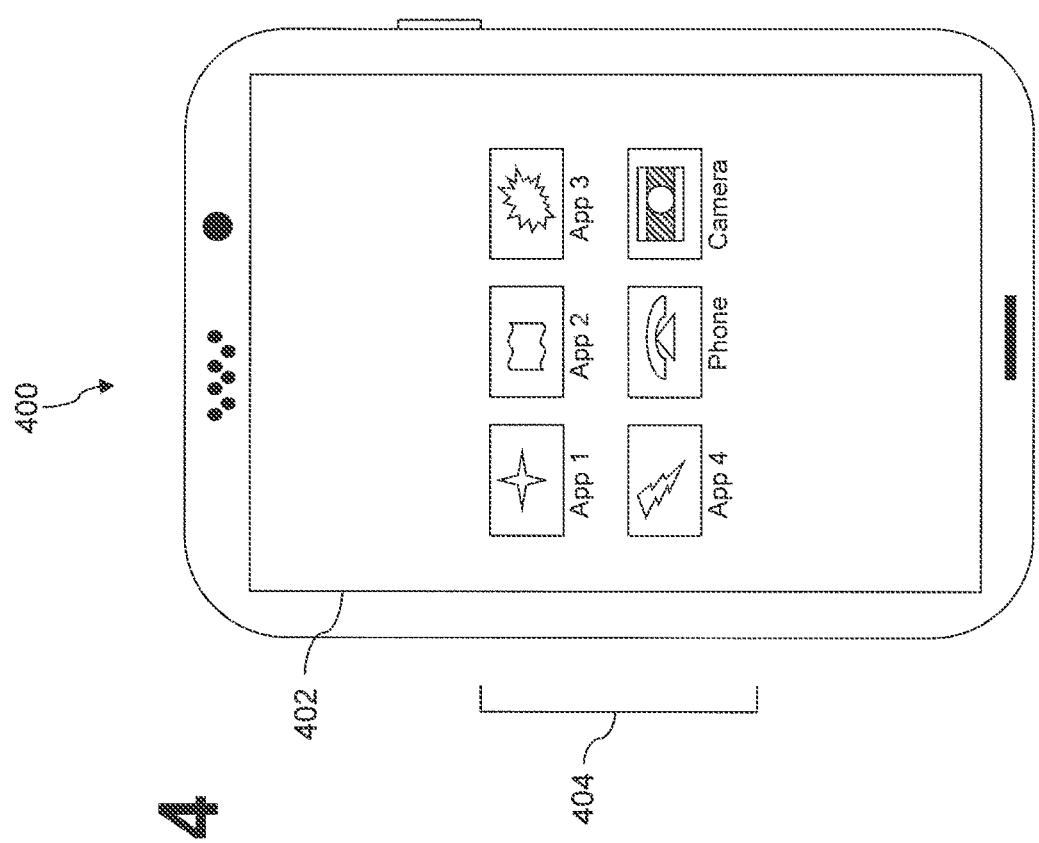
FIG. 4 is an illustration of a handset according to an embodiment of the disclosure.

FIG. 4 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, a media player, a wearable computer, or a headset computer. In an embodiment, wearable technology may comprise devices incorporated into accessories as well as technology permanently or semi-permanently coupled to a person or persons, including but not limited to jewelry, footwear, eyewear, and medically implanted technology. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
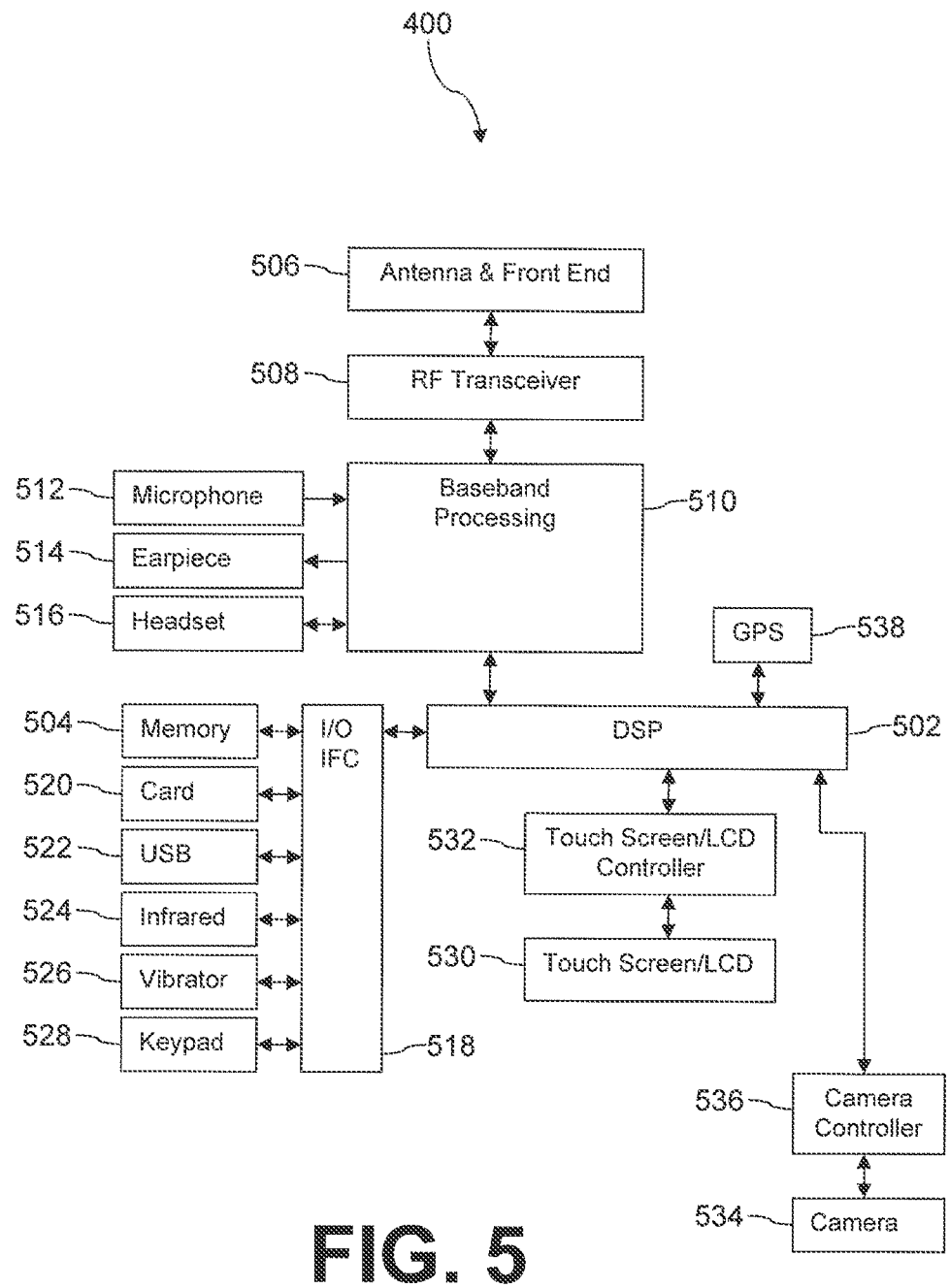
FIG. 5 is a block diagram of a hardware architecture of a handset according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
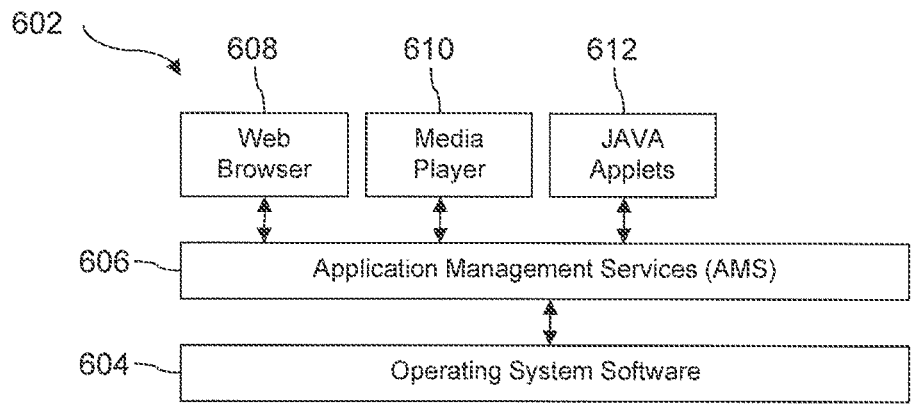
FIG. 6A is a block diagram of a software architecture of a handset according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 5A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 6B:
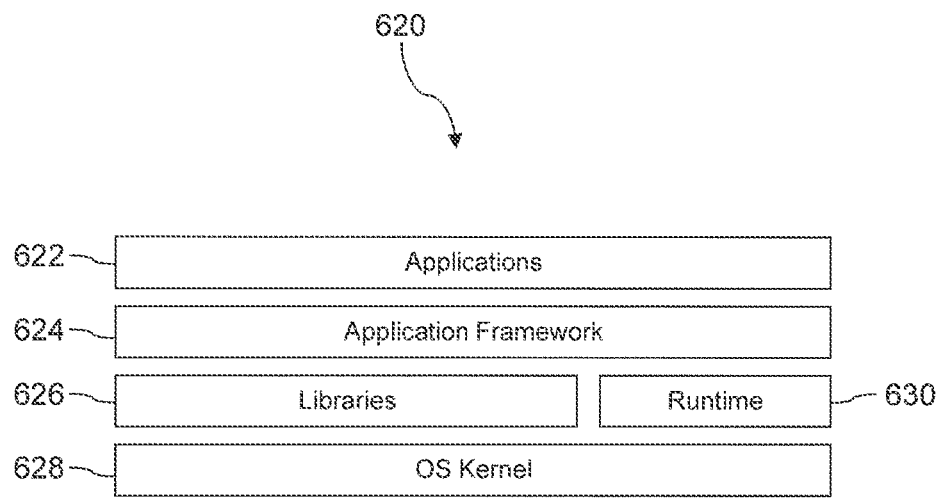
FIG. 6B is a block diagram of another software architecture of a handset according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
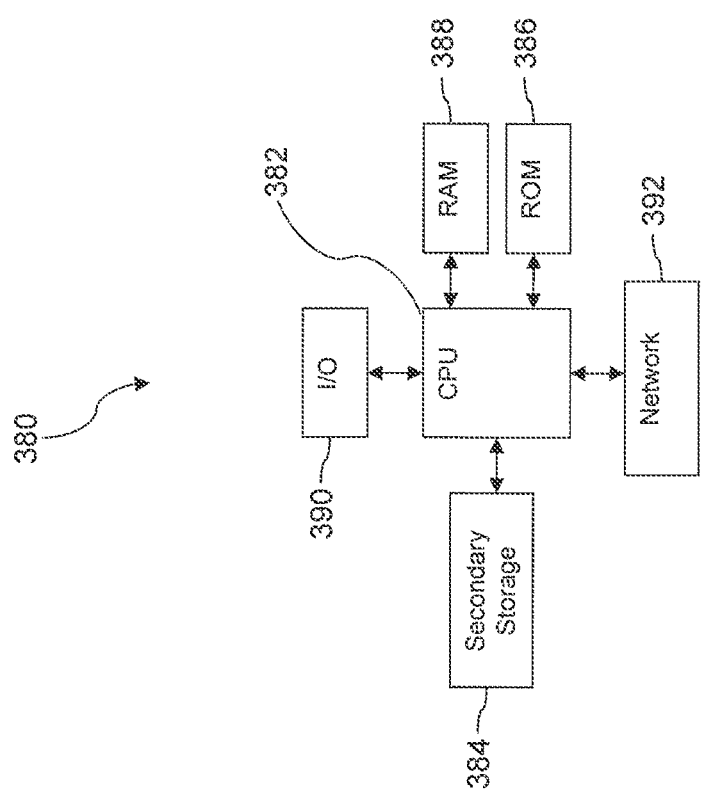
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of selectively transmitting content, comprising:
    intercepting, by a policy engine stored in a non-transitory memory of a user equipment (UE), a request for content from an application stored in the non-transitory memory of the UE;
    determining, by the policy engine, at least one policy of a plurality of policies stored in the policy engine and associated with at least one of the request, the application, and the UE;
    based on the policy and in response to a determination that the requesting application is associated with a blacklist, blocking, by the policy engine, transmission of at least some of the requested content and transmitting, by the policy engine, a placebo message to the requesting application based on a determination that the requesting application anticipates a response;
    receiving, by a policy server, a plurality of signals from the policy engine;
    comparing, by the policy server, the plurality of received signals to a plurality of expected signals;
    sending, by the policy server, a fraud alert in response to the comparison;
    transmitting, by the policy server, in response to the comparison, a file to the UE, wherein the file comprises an auto-installation routine and an executable associated with the policy engine, and wherein the UE reinstalls the policy engine via the file; and
    receiving, by the policy server, from the updated and installed policy engine, a second plurality of signals subsequent to reinstallation of the policy engine.

2. The method of claim 1, further comprising determining, by the policy engine, the policy associated with the request based on a network state of the UE.

3. The method of claim 1, further comprising blocking, by the policy engine, transmission of at least some of the requested content based on a remaining data amount of a user account associated with the UE.

4. The method of claim 1, further comprising receiving, by the policy engine, from a policy server, a plurality of updates to the policy engine, wherein the plurality of updates are received at periodic intervals.

5. The method of claim 4, further comprising updating, by the policy server, at least one policy based on the plurality of updates and transmitting the at least one updated policy to a plurality of UEs that comprise policy engines.

6. The method of claim 1, wherein the blacklist is stored in the policy engine.

7. The method of claim 1, further comprising receiving, by the policy engine, from a policy server located remotely from the UE, an update to the policy engine comprising at least one of a new policy or a revised policy.

8. The method of claim 1, further comprising sending, by the policy engine, a request to a policy server for an update to the policy engine in response to a triggering event comprising installation of a previously uninstalled application or an update to an installed application or in response to a determination that the policy engine does not comprise a policy associated with the requesting application.

9. The method of claim 1, wherein determining the policy associated with the requesting application is based on at least one of a developer of the requesting application and an account associated with the UE.

10. The method of claim 9, wherein the account associated with the UE comprises a predetermined amount of data services allotted over a period of time, and wherein a request for second content from a second application stored in the non-transitory memory of the UE is denied by the policy engine based on a determination that this predetermined amount of data services has been exceeded or will be exceeded by the transmission of the requested second content.

11. The method of claim 1, wherein the plurality of signals are received based on a predetermined schedule from the policy engine or in response to a triggering event that comprises installation of a previously uninstalled application, an update to an installed application, a determination that an application stored on the UE is requesting access to other applications, or a determination that an application stored on the UE is transmitting data above a predetermined threshold.

12. The method of claim 1, further comprising transmitting, by the policy server, to a fraud server, the plurality of signals received from the policy engine.

13. The method of claim 1, further comprising executing, by the policy server, a hash function on at least some of the plurality of received signals.

14. The method of claim 13, further comprising sending, by the policy server, to the fraud server, a fraud alert, based on a determination that the executed hash function did not produce an expected value.

15. The method of claim 1, further comprising:
intercepting, by the policy engine, a second request for content from a second application stored in the non-transitory memory of the UE;
determining, by the policy engine, at least one policy of the plurality of policies stored in the policy engine and associated with at least one of the second request, the second application, and the UE; and
based on the policy, transmitting, by the policy engine, the request to a content provider based upon a determination that the second application is associated with a whitelist.

16. The method of claim 15, further comprising transmitting, by the policy engine, at least a portion of content received from the content provider to the second application based upon a determination that the second application is associated with the whitelist.

17. A system for selectively transmitting information comprising:
a user equipment (UE) comprising a non-transitory memory, a plurality of applications, a policy engine, and a processor configured to execute the plurality of applications and the policy engine, wherein the UE is in communication with a policy server via a network that stores a plurality of policies associated with selective content transmission, wherein the policy engine, when executed by a processor, is configured to:
receive a request for first content from a first application of the plurality of applications stored on the UE;
determine at least a first policy stored in the policy engine associated with the first application;
based on the first policy and in response to a determination that the first application is associated with a blacklist, block at least some the requested first content and transmit an HTTP200 response to the first application based on a determination that the first application anticipates a response;
receive a request for second content from a second application of the plurality of applications stored on the UE;
determine, based on at least a second policy stored in the policy engine and associated with the second application, a response, wherein the determined response comprises at least one of:
transmitting at least some of the requested second content,
blocking at least some of the requested second content;
sending a notification to the second application indicating that at least some of the requested second content is blocked;
transmitting an HTTP200 response to the second application; or
transmitting a notification to the policy server; and
the policy server configured to:
receives a plurality of signals from the policy engine;
compares the plurality of received signals to a plurality of expected signals;
sends a fraud alert in response to the comparison;
transmits, in response to the comparison, a file to the UE, wherein the file comprises an auto-installation routine and an executable associated with the policy engine, and wherein the UE reinstalls the policy engine via the file; and
receives from the updated and installed policy engine, a second plurality of signals subsequent to reinstallation of the policy engine.

18. The system of claim 17, wherein the determined response comprises transmitting the notification to the policy server, and wherein the notification transmitted to the policy server is associated with one of blocked content, transmitted content, and requests received.

19. The system of claim 17, wherein the determined response is further based on a network state of the UE.

* * * * *